US011856062B2

(12) United States Patent
Liu et al.

(10) Patent No.: US 11,856,062 B2
(45) Date of Patent: Dec. 26, 2023

(54) MULTI-DEVICE CONNECTION MANAGEMENT

(71) Applicant: International Business Machines Corporation, Armonk, NY (US)

(72) Inventors: Su Liu, Austin, TX (US); Demetrice Browder, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/668,175

(22) Filed: Feb. 9, 2022

(65) Prior Publication Data

US 2022/0174120 A1    Jun. 2, 2022

Related U.S. Application Data

(63) Continuation of application No. 17/103,010, filed on Nov. 24, 2020, now Pat. No. 11,258,858.

(51) Int. Cl.
| H04L 67/14 | (2022.01) |
| H04L 67/104 | (2022.01) |
| H04L 43/065 | (2022.01) |
| H04L 67/50 | (2022.01) |
| H04L 67/141 | (2022.01) |
| H04L 67/148 | (2022.01) |

(52) U.S. Cl.
CPC ............ *H04L 67/14* (2013.01); *H04L 43/065* (2013.01); *H04L 67/1044* (2013.01); *H04L 67/141* (2013.01); *H04L 67/148* (2013.01); *H04L 67/535* (2022.05)

(58) Field of Classification Search
None
See application file for complete search history.

(56) References Cited

U.S. PATENT DOCUMENTS

| 10,791,178 | B1* | 9/2020 | Srinivasa Ragavan ..................... G10L 15/22 |
| 2017/0026974 | A1* | 1/2017 | Dey .................. H04M 3/42263 |
| 2018/0213364 | A1 | 7/2018 | Segal et al. |
| 2018/0332084 | A1* | 11/2018 | Choe ................. H04M 3/42263 |
| 2019/0199660 | A1* | 6/2019 | Mukherjee ............ H04L 51/046 |

FOREIGN PATENT DOCUMENTS

WO    2018213401 A1    11/2018

OTHER PUBLICATIONS

Intellectual Property Office, Combined Search and Examination Report, Application No. GB2116058.5, dated Mar. 30, 2022.
Application No. 202111382230.5, OA1, dated Oct. 13, 2023.

* cited by examiner

*Primary Examiner* — James A Edwards
(74) *Attorney, Agent, or Firm* — Garg Law Firm, PLLC; Rakesh Garg; Nathan Rau

(57) ABSTRACT

A connection request is received for an account, the account associated with a set of devices, the connection request comprising a request to establish communication between a sending device and a device associated with the account. By analyzing device usage data for a first device in the set of devices, an availability score of the first device is determined. The first device is presented for connection based on the availability score of the first device. Responsive to the presenting, the sending device and the first device are connected.

20 Claims, 14 Drawing Sheets

MULTI-DEVICE CONNECTION MANAGEMENT

BACKGROUND

The present invention relates generally to a method, system, and computer program product for managing device connection. More particularly, the present invention relates to a method, system, and computer program product for multi-device connection management.

Users typically have access to more than one communications capable device. For example, devices in the form of a smartphone, a tablet computer, a laptop computer, a desktop computer, a wearable computing device, a smart speaker, or any other suitable device are all capable of executing application software to enable a device user to communicate with software executing on another device or data processing system.

Because users typically have access to more than one communications capable device, users often link devices together on one account, typically using a single user identification that is unique to a user. For example, a user might configure her smartphone, tablet computer, laptop computer, and office desktop computer with telephony applications that all use the same registered telephone number for voice communications and texting. As a result, this user can answer calls on any device she has immediately available, such as her office desktop computer when at the office and her smartphone while driving home from the office. As another example, a user might configure her smartphone, tablet computer, laptop computer, and the smart speakers in her living room and bedroom to use a common music streaming account, then use the account to play music on whichever device is currently convenient.

A communication request is a request to establish communication between a sending device and a device associated with an account. Example communication requests include an indication of an incoming voice or video call and a response to a user's request to play music stored on a remote computer system.

SUMMARY

The illustrative embodiments provide a method, system, and computer program product. An embodiment includes a method that receives a connection request for an account, the account associated with a set of devices, the connection request comprising a request to establish communication between a sending device and a device associated with the account. An embodiment determines, by analyzing device usage data for a first device in the set of devices, an availability score of the first device. An embodiment presents, for connection based on the availability score of the first device, the first device. An embodiment connects, responsive to the presenting, the sending device and the first device.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
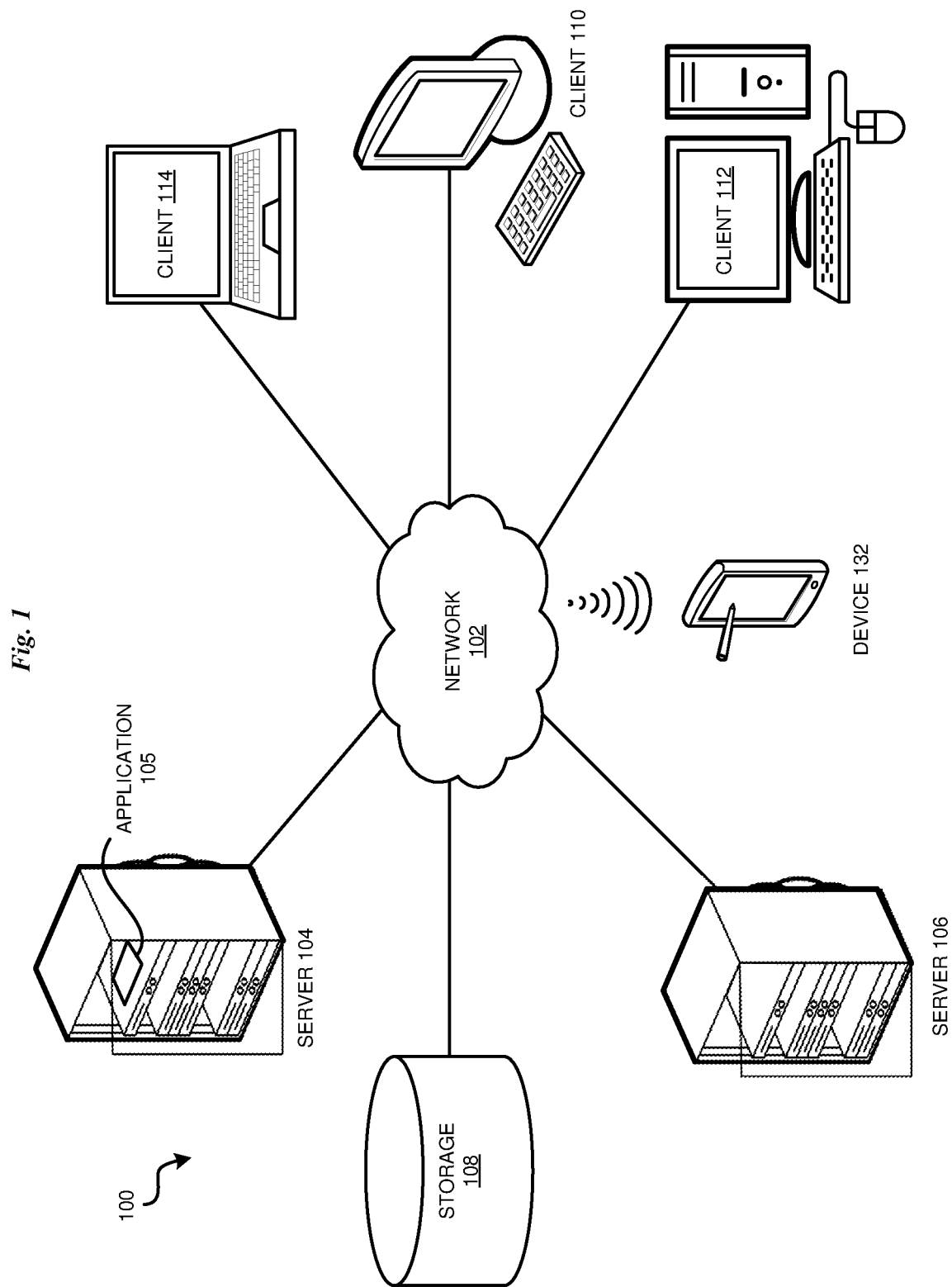
FIG. 1 depicts a block diagram of a network of data processing systems in which illustrative embodiments may be implemented.

The illustrative embodiments recognize that, when multiple devices share an account and a communication request is received, one option is to fulfill the request on every available device. For example, a user might configure her smartphone, tablet computer, laptop computer, and office desktop computer with telephony applications that all use the same registered telephone number or other unique user identification for voice communications and texting. Then, when an incoming call occurs, each device that is currently available for network communications indicates the incoming call. However, if a user's smartphone, tablet computer, and laptop computer all happen to be located next to each other, all three will indicate the incoming call, which is unnecessary and can be annoying. As another example, a user might configure her smartphone, tablet computer, laptop computer, and the smart speakers in her living room and bedroom to use a common music streaming account, but if smartphone and tablet computer are currently in the living room along with the living room smart speaker, all three might play the requested music, creating a cacophony.

The illustrative embodiments recognize that, when multiple devices share an account and a communication request is received, another option is to fulfill the request using a predefined, static list of prioritization rules. For example, in the case of an incoming call the user's smartphone might always indicate the incoming call, with a rollover to the next device in the priority list only if the smartphone is inaccessible to the communications network. However, the highest priority device might not be the device best suited for the current situation. For example, the user's smartphone, while the highest priority, might be in a poor cellular data reception area and communicate at only 3G speeds, while other available devices such as a tablet (using Wi-Fi) or laptop computer (using a wired network connection) might be capable of higher speeds and thus, improved call quality. In addition, configuring multiple priority lists, applicable to multiple situations, quickly becomes tiresome and still does not adapt to unforeseen situations, changing device and network capabilities, and a user's evolving preferences. Thus, the illustrative embodiments recognize that, when a communication request is received for an account, there is an unmet need to automatically select the most suitable device to use with the account, and to update the suitability determination based on changing conditions and preferences.

The illustrative embodiments recognize that the presently available tools or solutions do not address these needs or provide adequate solutions for these needs. The illustrative embodiments used to describe the invention generally address and solve the above-described problems and other problems related to multi-device connection management.

An embodiment can be implemented as a software application. The application implementing an embodiment can be configured as a modification of an existing data communications system, as a separate application that operates in conjunction with an existing data communications system, a standalone application, or some combination thereof.

Particularly, some illustrative embodiments provide a method of receiving a connection request for an account, determining, by analyzing device usage data for a first device in a set of devices associated with the account, an availability score of the first device, presenting, for connection based on the availability score of the first device, the first device, and connecting a sending device and the first device.

An embodiment associates one or more of devices with a user account. One embodiment receives user input associating a device with an account. Another embodiment automatically associates a device with an account. For example, when a user configures an application to use the account the application might automatically associates the device on which the application is executing with the account. Another embodiment uses a device detection technique to associate a device with an account, for example by detecting and associating any new device that joins a known Wi-Fi or other communications network. (Wi-Fi is a registered trademark of Wi-Fi Alliance in the United States and other countries.)

An embodiment configures and manages a rule set used in determining an availability score of a device associated with the account. The rule set specifies one or more components used to compute the availability score, the calculation to be used to combine components into an availability score, and how a score component is computed from input data. In one embodiment, a user is able to configure a portion or all of the rule set manually. Another embodiment includes a default rule set that is further adjusted based on user input, either during device configuration or learned from a user's device selections.

In one embodiment, a component of the availability score of a device associated with the account is a connection factor of the device. A device capable of communicating data at a high speed typically provides a higher-quality user experience than another device with the same outputs but capable of communicating data at a lower speed. For example, when video conferencing picture quality will be higher and lag time shortened when a device communicates data at the typical speeds of a wired network connection as compared to the typical speeds of a 3G cellular data connection. Thus, a device capable of a higher speed connection would have a connection factor higher than that of a device capable of a comparatively lower speed connection.

In one embodiment, a component of the availability score of a device associated with the account is a device capability factor relating to the nature of the connection request. For example, a smart speaker device typically has a higher-quality sound reproduction capability than a laptop computer. Thus, when the connection request involves streaming music, an embodiment might score the smart speaker device higher than the laptop computer. As another example, if the connection request is for a video call, to provide the highest possible video quality an embodiment might score devices proportionally to the size or resolution of their display screen.

In one embodiment, a component of the availability score of a device associated with the account is a device usage factor of the device. A device usage factor includes one or more of a time since a device was last used, a time for which a device was last used, an average usage time of a device, and other usage-related device data. The shorter the time since a device was last used, the more likely that device is to still be available for use. For example, if a user is currently using a device, or last used a device two minutes ago, that device is likely still near the user. On the other hand, if a user last used a device an hour ago, the user might have left the device in a different location. Devices that are used longer, both most recently and averaged over period of time, are also more likely to be preferred than devices which are not used as long. Thus, if a first device is used longer than a second device, a device usage factor of the first device should be higher than a device usage factor of the second device.

In one embodiment, a component of the availability score of a device associated with the account is a distance factor between the device and the account's user. For example, a user's desktop computer, permanently installed at the user's office, is unavailable when the user is not at the office. One embodiment determines a device's location using an already-available capability of the device. For example, a device with geolocation capability, such as a smartphone, can report its location within several meters of accuracy. As another example, a device with Wi-Fi capability, such as a tablet or laptop computer, might be accessing a network with a known location, such as the user's home or office network. As a third example, a device with a wired networking capability, such as a desktop computer, might be access a network through an access point with a known location, such as room XYZ of the user's office building.

One embodiment infers a user's location from a location of a device associated with the account. For example, a wearable currently being worn (as determined using one or more device sensors) might be assumed to be worn by the account user. As another example, users rarely go far without their smartphones, so a user's location might be assumed to be the same as the smartphone's location or within a threshold amount of the smartphone's location.

Another embodiment determines a user's location directly, using sensor data of a device associated with the account or a different device. For example, access control data for the user's office building might indicate that the user entered the building earlier today and has not yet exited the building. Thus, an embodiment concludes that this user is at the office rather than a different location. As another example, if a user's home has a thermostat with a presence detecting capability and the ability to communicate over a communications network, an embodiment might use this data to determine whether or not the user is home. Some devices provide more precise user location data than other devices. For example, access control data might only be usable to determine whether or not a user is in the building, thermostat data might be usable to determine whether or not the user is home (or on which floor if there are multiple such thermostats), while a video surveillance system or radio frequency identification (RFID) system might be usable to determine (upon user opt-in) which room a user is in or a distance from a particular RFID sensor interrogator. However, precise user location data is not always necessary. For example, if a user is not at the office, the desktop computer in her office is unavailable no matter where the user actually is. Thus, if a distance between the device and the account's user is above a predetermined threshold, one embodiment sets the distance factor to a present maximum value indicating that device's unavailability.

In one embodiment, a component of the availability score of a device associated with the account is a user preference factor. For example, a user may prefer to use a smartphone for a particular account or type of communication request, even though another device might score higher using another factor. In one embodiment, a user provides preference information via a user interface. Another embodiment learns preference information from a user's device choices and adjusts the user preference factor accordingly. For example, if a user, when faced with a choice between using her smartphone and her tablet, always selects the smartphone, this embodiment updates the user preference factor to score the smartphone higher than the tablet.

An embodiment receives a connection request for an account. The communication request is a request to establish communication between a sending device and a device associated with the account. Some non-limiting examples of a communication request are an indication of an incoming voice or video call and a response to a user's request to play music stored on a remote computer system.

An embodiment analyzes device data for a device associated with the account to compute one or more availability score components specified in the rule set. In particular, one embodiment computes a connection factor of the device. Another embodiment computes a device capability factor relating to the nature of the connection request. Another embodiment computes a device usage factor of the device. Another embodiment computes a distance factor between the device and the account's user, by determining a device's location and inferring a user's location from a location of a device associated with the account or determining a user's location directly, using sensor data of a device associated with the account or a different device.

From the availability score components specified in the rule set, an embodiment determines an availability score of a device associated with the account. One embodiment computes an availability score in response to a communications request. Another embodiment periodically computes an availability score for one or more devices associated with an account, so that availability scores are ready when a communication request is received. Another embodiment periodically collects the data used to compute a device's availability score, but waits to compute the availability score until a communication request is received.

An embodiment selects one or more devices based on the device's availability score, presents the selected device to the account's user for connection, and, when the user accepts the connection, connects the sending device and the selected device to fulfill the communication request. One embodiment ranks devices based on their availability scores and selects the device with the highest availability score.

Another embodiment ranks devices based on their availability scores, determines that multiple devices have the highest availability scores and availability scores within a threshold difference of each other, selects two or more of the multiple devices, presents the selected devices to the account's user for connection, and, when the user accepts the connection on one of the devices, connects the sending device and the selected device to fulfill the communication request. Based on the user's selection and the components of the devices' availability scores, the embodiment adjusts a user preference factor, and uses the adjusted user preference factor in computing one or more device availability scores for a future communication request. For example, if a user's smartphone and tablet have the two highest availability scores, and the scores are within a threshold difference of each other, an embodiment presents both devices for connection, and, when the user accepts the connection using the smartphone, the embodiment updates the user preference factor to score the smartphone higher than the tablet in the future.

The manner of multi-device connection management described herein is unavailable in the presently available methods in the technological field of endeavor pertaining to device management in data communications. A method of an embodiment described herein, when implemented to execute on a device or data processing system, comprises substantial advancement of the functionality of that device or data processing system in receiving a connection request for an account, determining, by analyzing device usage data for a first device in a set of devices associated with the account, an availability score of the first device, presenting, for connection based on the availability score of the first device, the first device, and connecting a sending device and the first device.

The illustrative embodiments are described with respect to certain types of accounts, communication requests, device capabilities, sensor data, device usage data, availability score components, user preferences, thresholds, responses, rankings, adjustments, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
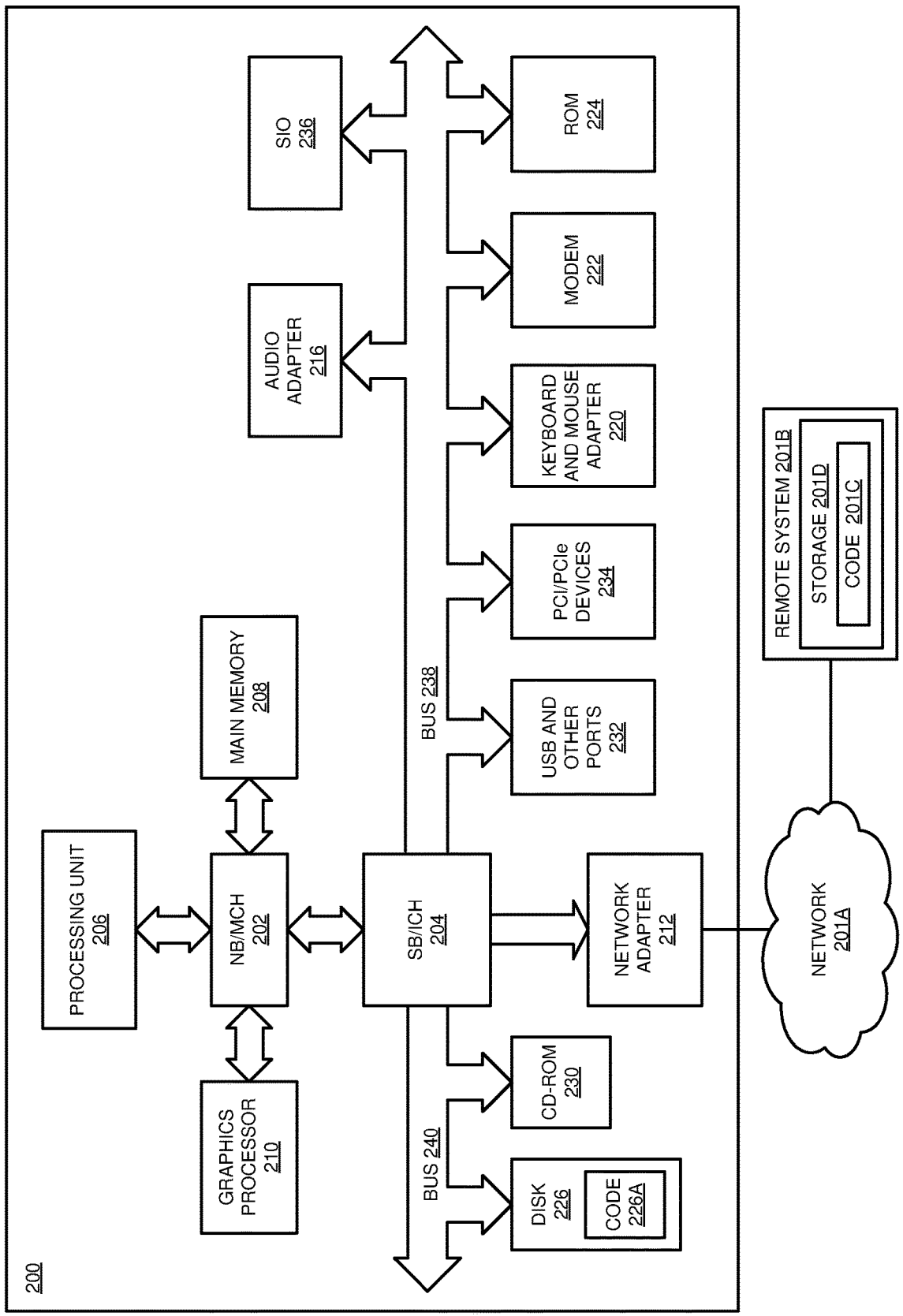
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in any of servers 104 and 106, clients 110, 112, and 114, and any form of device 132. Application 105 is also configurable to collect data form one or more instances of device 132 to select one or more instances of device 132 for presentation to a user in response to a communication request.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
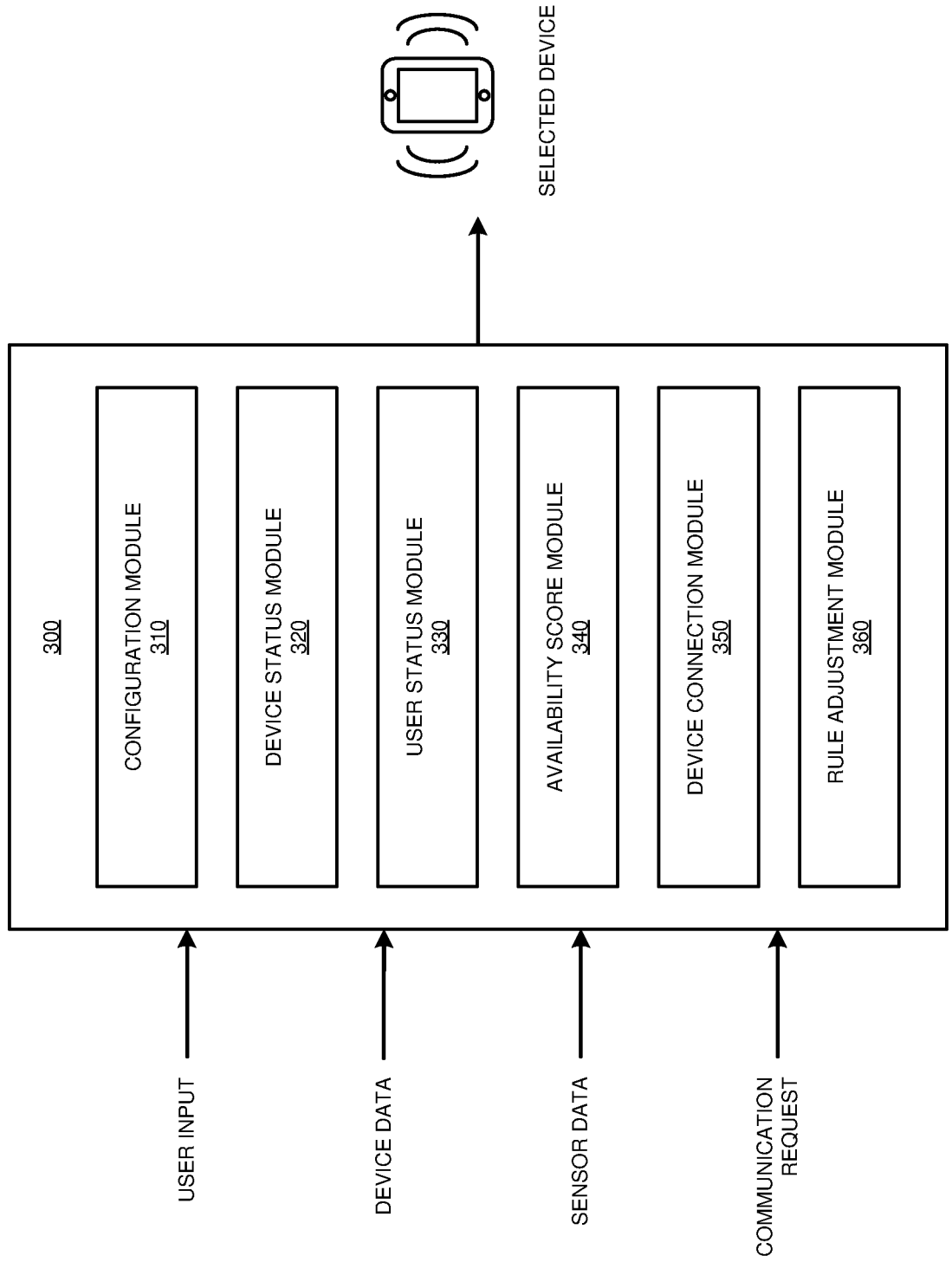
FIG. 3 depicts a block diagram of an example configuration for multi-device connection management in accordance with an illustrative embodiment.

With reference to FIG. 3, this figure depicts a block diagram of an example configuration for multi-device connection management in accordance with an illustrative embodiment. Application 300 is an example of application 105 in FIG. 1 and executes in any of servers 104 and 106, clients 110, 112, and 114, and device 132 in FIG. 1.

Configuration module 310 associates one or more of devices with a user account. As well, configuration module 310 configures a rule set used in determining an availability score of a device associated with the account. The rule set specifies one or more components used to compute the availability score, the calculation to be used to combine components into an availability score, and how a score component is computed from input data.

Application 300 receives user input, such as user device selections and user-provided account configurations. Application 300 also receives device data and sensor data with which to compute device availability scores. Application 300 also receives a communications request for an account.

Device status module 320 collects and analyzes device data used to compute one or more availability score components specified in the rule set. Implementations of module 320 collect data used to compute one or more of a connection factor, device capability factor, device usage factor, and a device's location. User status module 330 collects and analyzes data used to infer a user's location from a location of a device associated with the account or to determine a user's location directly, using sensor data of a device associated with the account or a different device.

Availability score module 340 computes availability score components specified in the rule set, applies the availability score computation specified in the rule set, and determines an availability score of a device associated with the account. One implementation of module 340 computes an availability score in response to a communications request. Another implementation of module 340 periodically computes an availability score for one or more devices associated with an account, so that availability scores are ready when a communication request is received. Another implementation of module 340 periodically collects the data used to compute a device's availability score, but waits to compute the availability score until a communication request is received.

Device connection module 350 selects one or more devices based on the device's availability score, presents the selected device to the account's user for connection, and, when the user accepts the connection, connects the sending device and the selected device to fulfill the communication request. One implementation of module 350 ranks devices based on their availability scores and selects the device with the highest availability score. Another implementation of module 350 ranks devices based on their availability scores, determines that multiple devices have the highest availability scores and availability scores within a threshold difference of each other, selects two or more of the multiple devices, presents the selected devices to the account's user for connection, and, when the user accepts the connection on one of the devices, connects the sending device and the selected device to fulfill the communication request.

Based on the user's selection and the components of the devices' availability scores, rule adjustment module 360 adjusts a user preference factor. Availability score module 340 will uses the adjusted user preference factor in computing one or more device availability scores for a future communication request.

Figure 4:
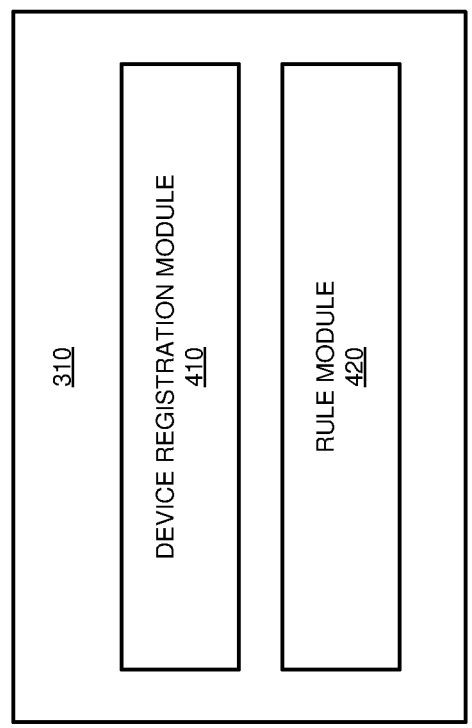
FIG. 4 depicts a block diagram of an example configuration for multi-device connection management in accordance with an illustrative embodiment.

With reference to FIG. 4, this figure depicts a block diagram of an example configuration for multi-device connection management in accordance with an illustrative embodiment. In particular, FIG. 4 depicts more detail of configuration module 310 in FIG. 3.

Device registration module 410 associates one or more of devices with a user account. One implementation of module 410 receives user input associating a device with an account. Another implementation of module 410 automatically associates a device with an account. For example, when a user configures an application to use the account the application might automatically associates the device on which the application is executing with the account. Another implementation of module 410 uses a device detection technique to associate a device with an account, for example by detecting and associating any new device that joins a known Wi-Fi or other communications network.

Rule module 420 configures and manages a rule set used in determining an availability score of a device associated with the account. The rule set specifies one or more components used to compute the availability score, the calculation to be used to combine components into an availability score, and how a score component is computed from input data. In one implementation of module 420, a user is able to configure a portion or all of the rule set manually. Another implementation of module 420 includes a default rule set that is further adjusted based on user input, either during device configuration or learned from a user's device selections.

In implementations of module 420, components of the availability score of a device associated with the account include a connection factor of the device, a device capability factor relating to the nature of the connection request, a device usage factor of the device, a user preference factor, and a distance factor between the device and the account's user. The distance factor is determined using an already-available capability of the device, by inferring a user's location from a location of a device associated with the account, or by determining a user's location directly, using sensor data of a device associated with the account or a different device.

Figure 5:
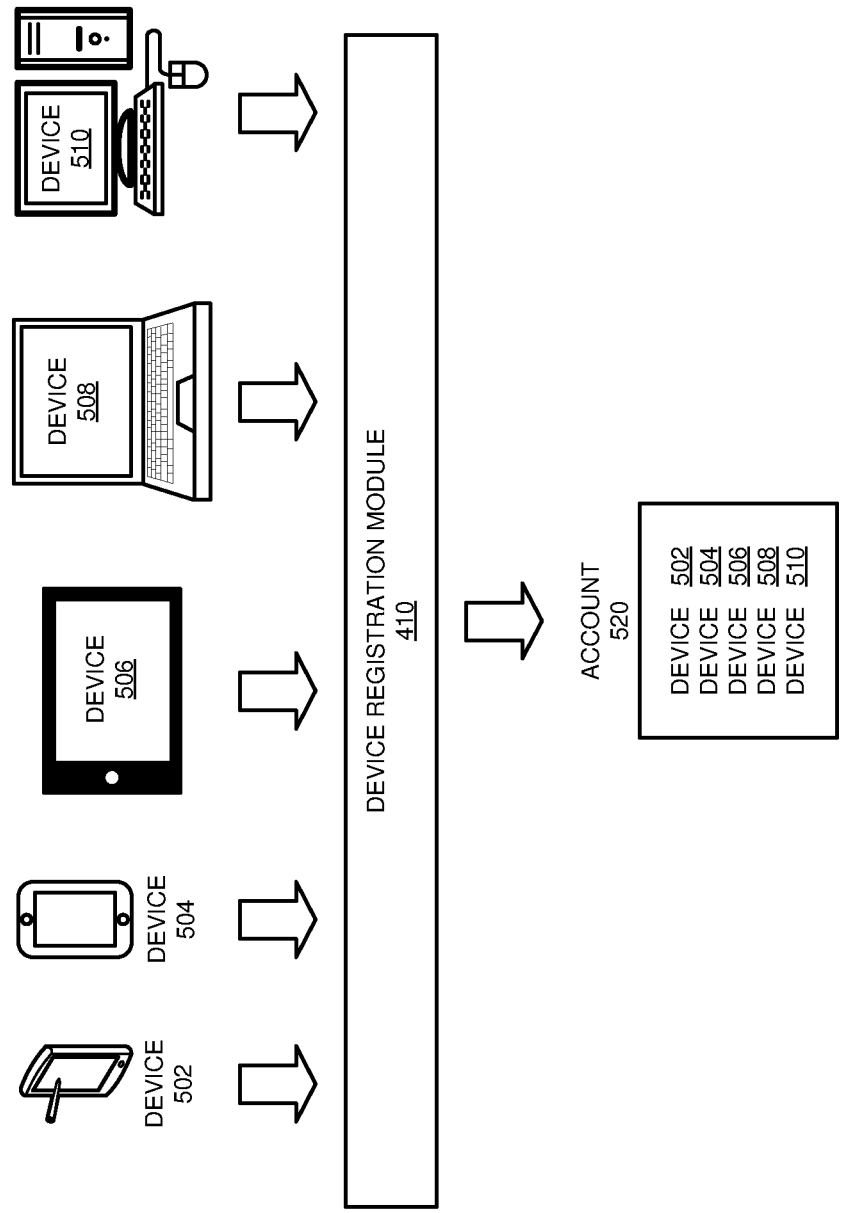
FIG. 5 depicts an example of multi-device connection management in accordance with an illustrative embodiment.

With reference to FIG. 5, this figure depicts an example of multi-device connection management in accordance with an illustrative embodiment. The example can be executed using application 300 in FIG. 3. Device registration module 410 is the same as device registration module 410 in FIG. 4.

Device 502 is a smartphone that includes a stylus input capability. Device 504 is a different smartphone, without a stylus input capability. Device 506 is a tablet device. Device 508 is a laptop computer, and device 510 is a desktop computer. Device registration module 410 associates devices 502, 504, 506, 508, and 510 with user account 520.

Figure 6:
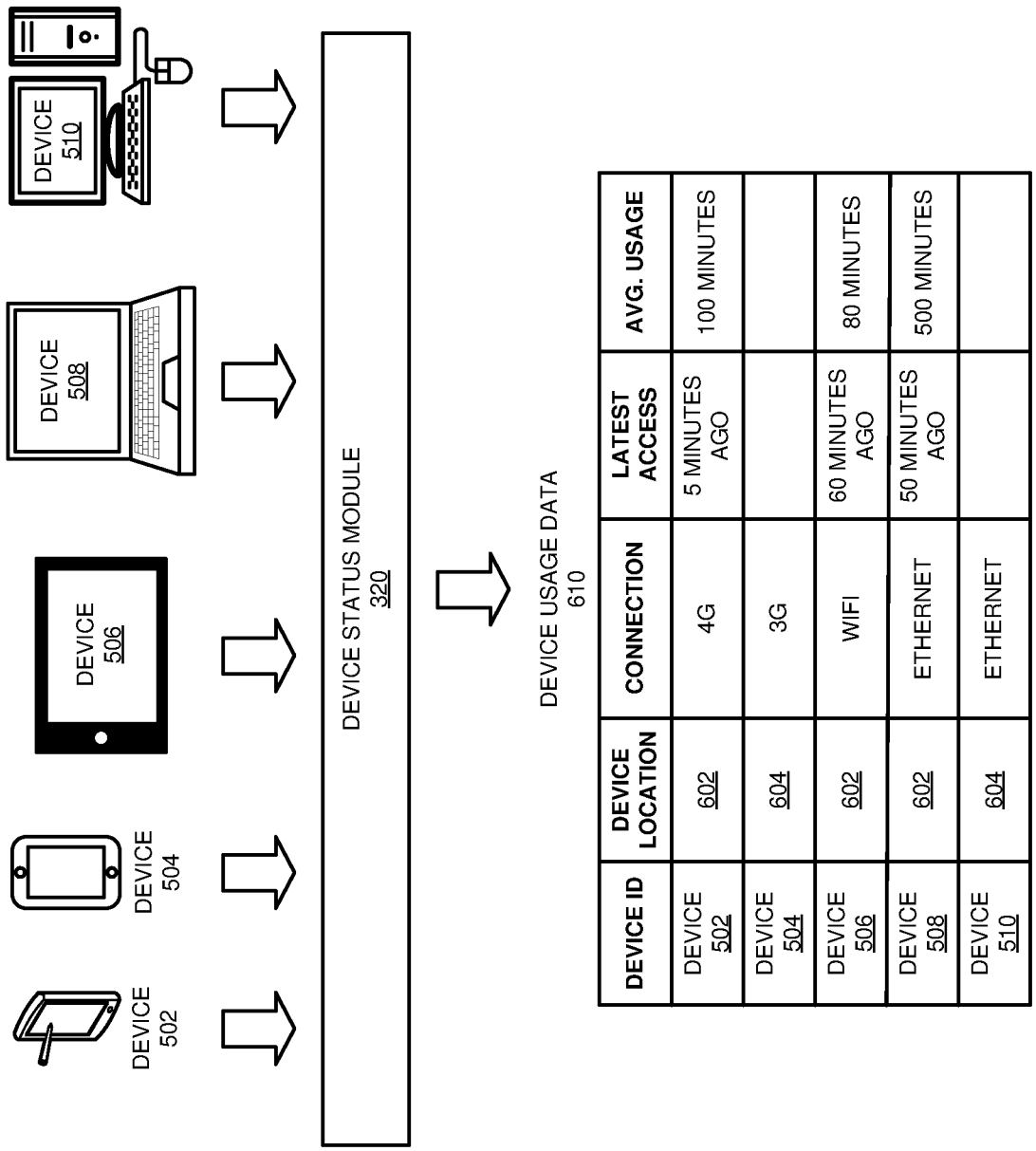
FIG. 6 depicts a continued example of multi-device connection management in accordance with an illustrative embodiment.

With reference to FIG. 6, this figure depicts a continued example of multi-device connection management in accordance with an illustrative embodiment. Device status module 320 is the same as device status module 320 in FIG. 3. Devices 502, 504, 506, 508, and 510 are the same as devices 502, 504, 506, 508, and 510 in FIG. 5.

Because devices 502, 504, 506, 508, and 510 are all associated with the same account, device status module 320 monitors each of them and collects the results in device usage data 610. As depicted, devices 502, 506, and 508 are in location 602 (e.g. a user's home), while devices 504 and 510 are in location 604 (e.g. a user's office).

Figure 7:
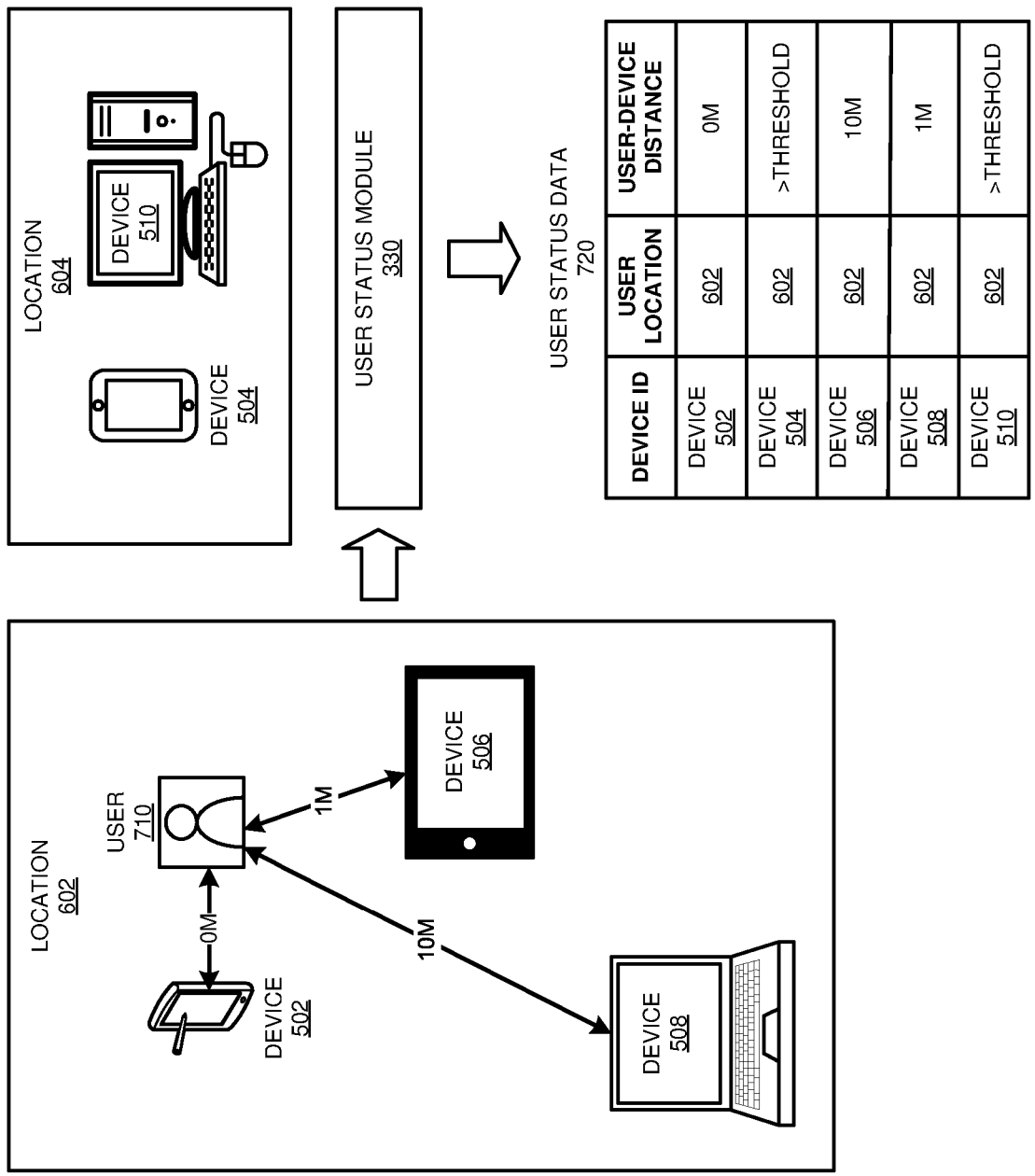
FIG. 7 depicts a continued example of multi-device connection management in accordance with an illustrative embodiment.

With reference to FIG. 7, this figure depicts a continued example of multi-device connection management in accordance with an illustrative embodiment. User status module 330 is the same as user status module 330 in FIG. 3. Devices 502, 504, 506, 508, and 510 are the same as devices 502, 504, 506, 508, and 510 in FIG. 5. Locations 602 and 604 are the same as locations 602 and 604 in FIG. 6.

At location 602, user 710 is 0 meters away from device 502, 1 meter away from device 506, and 10 meters away from device 508. Devices 504 and 510 are at location 604. User status module 330 collects and analyzes data used to infer a user's location from a location of a device associated with the account or to determine a user's location directly, using sensor data of a device associated with the account or a different device. The result is tabulated in user status data 720. Of note, because user 710 is at location 602, more than a threshold distance from the devices at location 604, module 330 has not attempted to determine an exact distance between user 710 and the devices at location 604.

Figure 8:
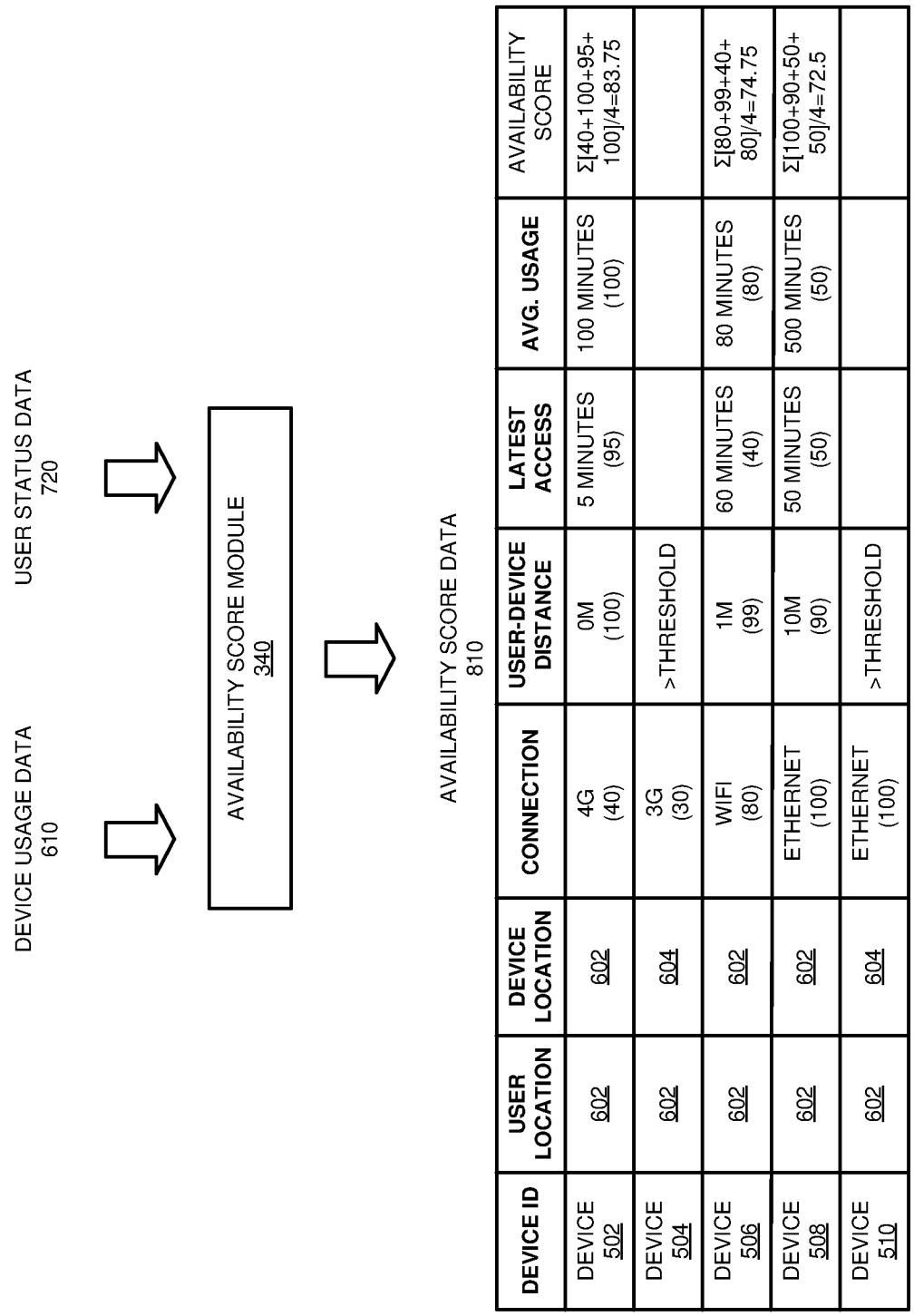
FIG. 8 depicts a continued example of multi-device connection management in accordance with an illustrative embodiment.

With reference to FIG. 8, this figure depicts a continued example of multi-device connection management in accordance with an illustrative embodiment. Availability score module 340 is the same as availability score module 340 in FIG. 3. Devices 502, 504, 506, 508, and 510 are the same as devices 502, 504, 506, 508, and 510 in FIG. 5. Locations 602 and 604 and device usage data 610 are the same as locations 602 and 604 and device usage data 610 in FIG. 6. User status data 720 is the same as user status data 720 in FIG. 7.

As depicted, availability score module 340 uses device usage data 610 and user status data 720 to compute availability score data 810. Component scores for each factor, on a common 0-100 scale, are depicted in parentheses below corresponding data. Thus, device 502 uses 4G for its data connection, resulting in a connection factor score of 40. Device 502 is 0 meters from user 710, resulting in a distance factor score between the device and the account's user of 100. User 710's latest access of device 502 was 5 minutes ago, for a score of 95, and the user's average usage time for this device is 100 minutes, for a score of 100. Module 340 uses a rule set that simply averages the score components together, resulting in an availability score for device 502 of 83.75. Availability scores for devices 506 and 508 were calculated similarly. Availability scores for devices 504 and 510 were not calculated because these devices are above a threshold distance from user 710 and thus unavailable. Note that the example data, corresponding availability scores, and rules used to compute example scores are only examples, and not intended to imply any particular required score or score computation.

Figure 9:
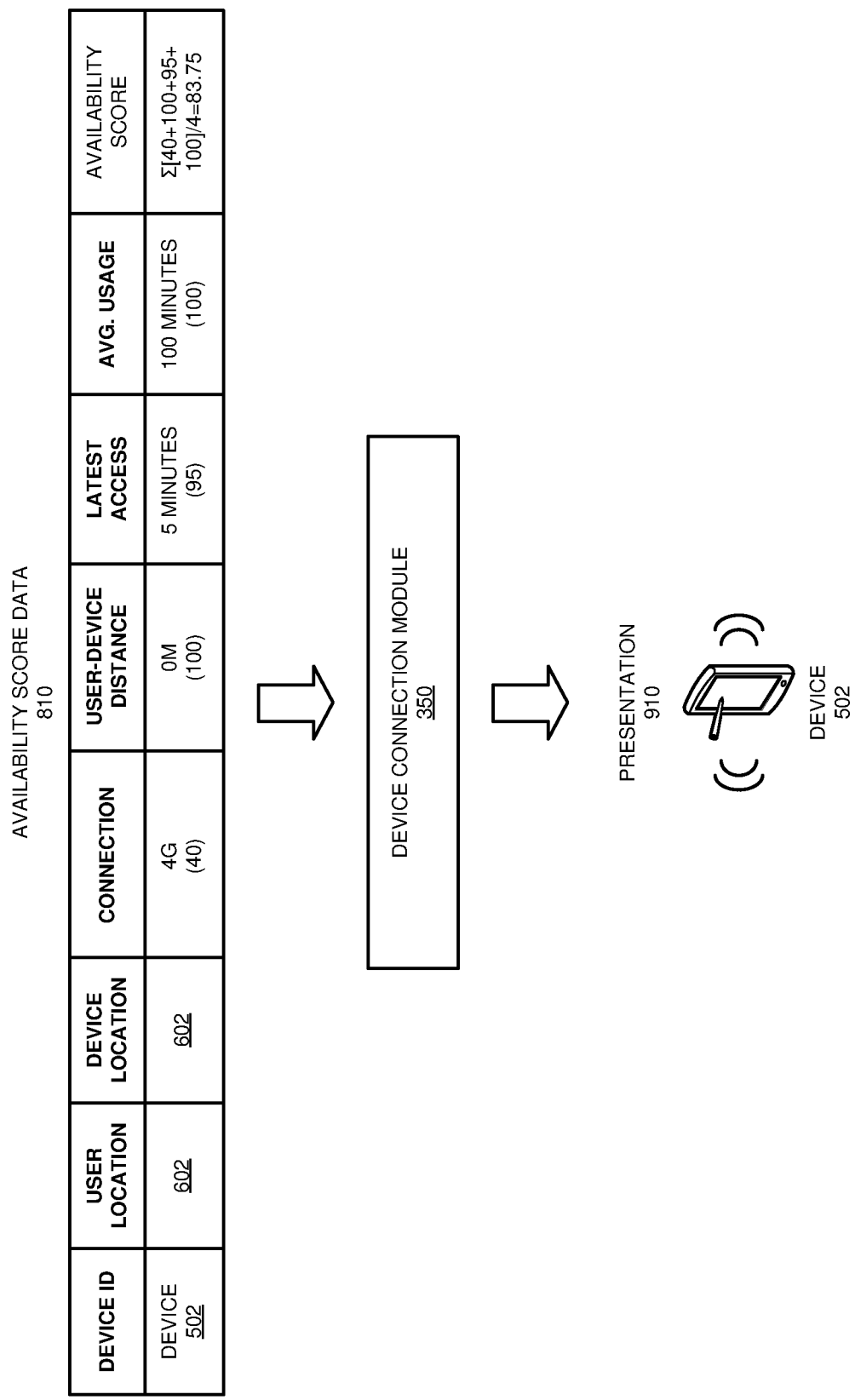
FIG. 9 depicts a continued example of multi-device connection management in accordance with an illustrative embodiment.

With reference to FIG. 9, this figure depicts a continued example of multi-device connection management in accordance with an illustrative embodiment. Device connection module 350 is the same as device connection module 350 in FIG. 3. Device 502 is the same as device 502 in FIG. 5. Location 602 is the same as location in FIG. 6. Availability score data 810 is the same as availability score data 810 in FIG. 8.

Here, because device 502 had the highest score in availability score data 810, device connection module 350 produces presentation 910, in which device 502 is presented to user 710 to respond to a connection request.

Figure 10:
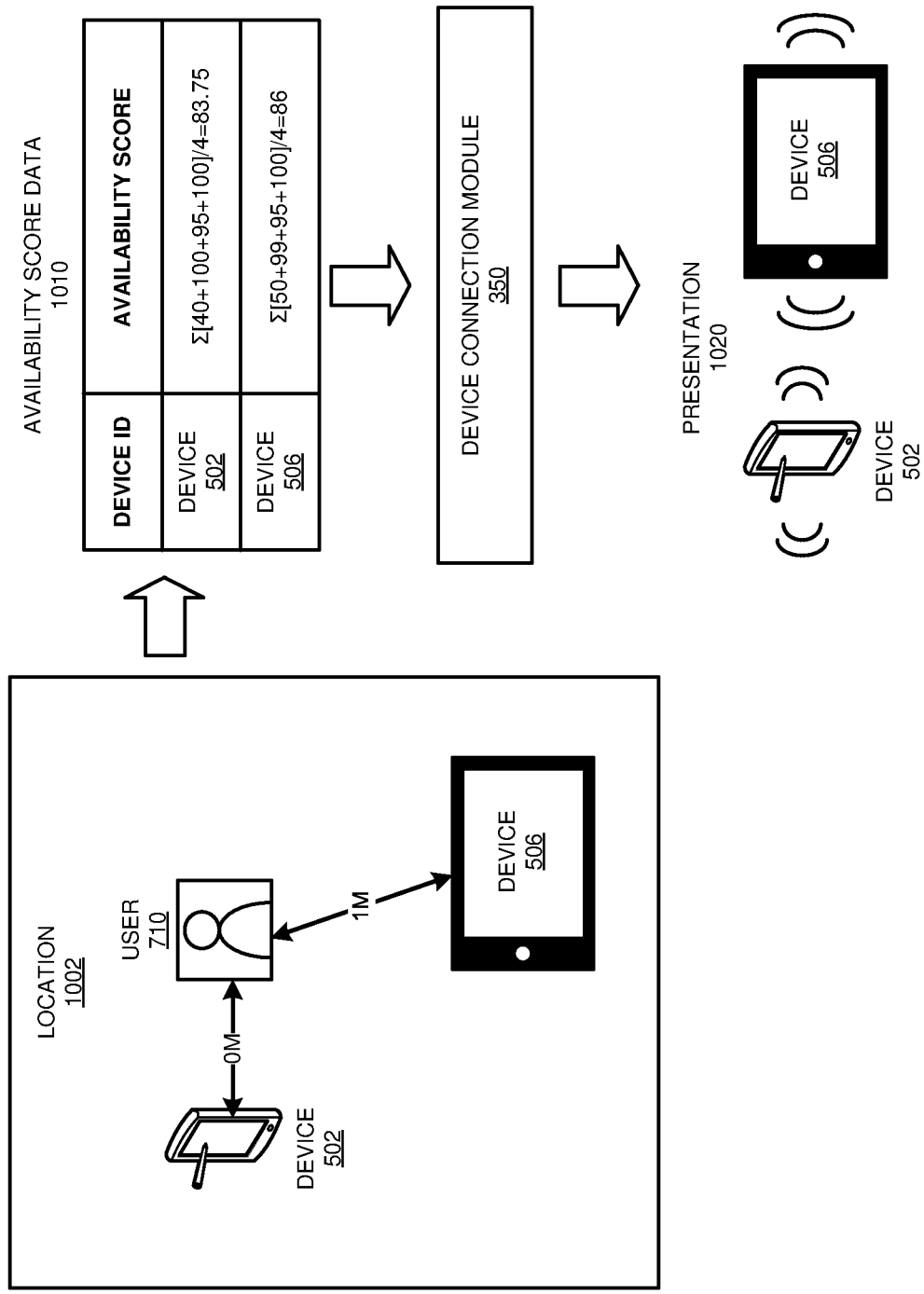
FIG. 10 depicts a continued example of multi-device connection management in accordance with an illustrative embodiment.

With reference to FIG. 10, this figure depicts a continued example of multi-device connection management in accordance with an illustrative embodiment. Device connection module 350 is the same as device connection module 350 in FIG. 3. Devices 502 and 506 are the same as devices 502 and 506 in FIG. 5.

Here, device 502 is 0 meters away from user 710 and device 506 is one meter away from user 710. Devices 502 and 506 and user 710 are all at location 1002. Thus, availability score module 340 has computed availability score data 1010, in which devices 502 and 506 have availability scores within a predetermined threshold distance of each other. Thus, device connection module 350 produces presentation 1020, in which both devices 502 and 506 are presented to user 710 to respond to a connection request.

Figure 11:
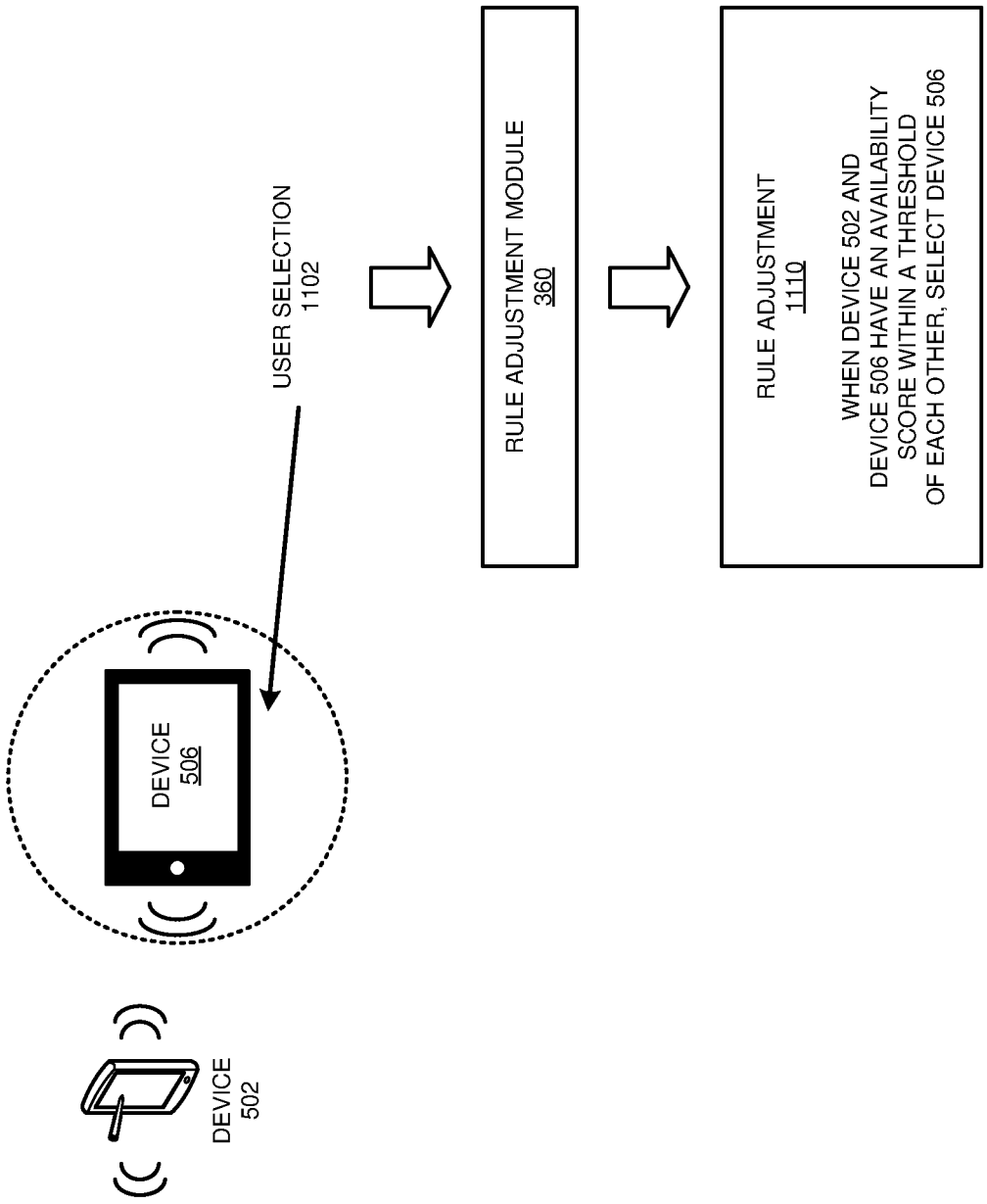
FIG. 11 depicts a continued example of multi-device connection management in accordance with an illustrative embodiment.

With reference to FIG. 11, this figure depicts a continued example of multi-device connection management in accordance with an illustrative embodiment. Rule adjustment module 360 is the same as rule adjustment module 360 in FIG. 3. Devices 502 and 506 are the same as devices 502 and 506 in FIG. 5.

Here, both devices 502 and 506 have been presented. In user selection 1102, user 710 selects device 506. Thus, rule adjustment module 360 generates rule adjustment 1110, indicating that when devices 502 and 506 have availability scores within a predetermined threshold distance of each other, device 506 should be selected to respond to a future communications request.

Figure 12:
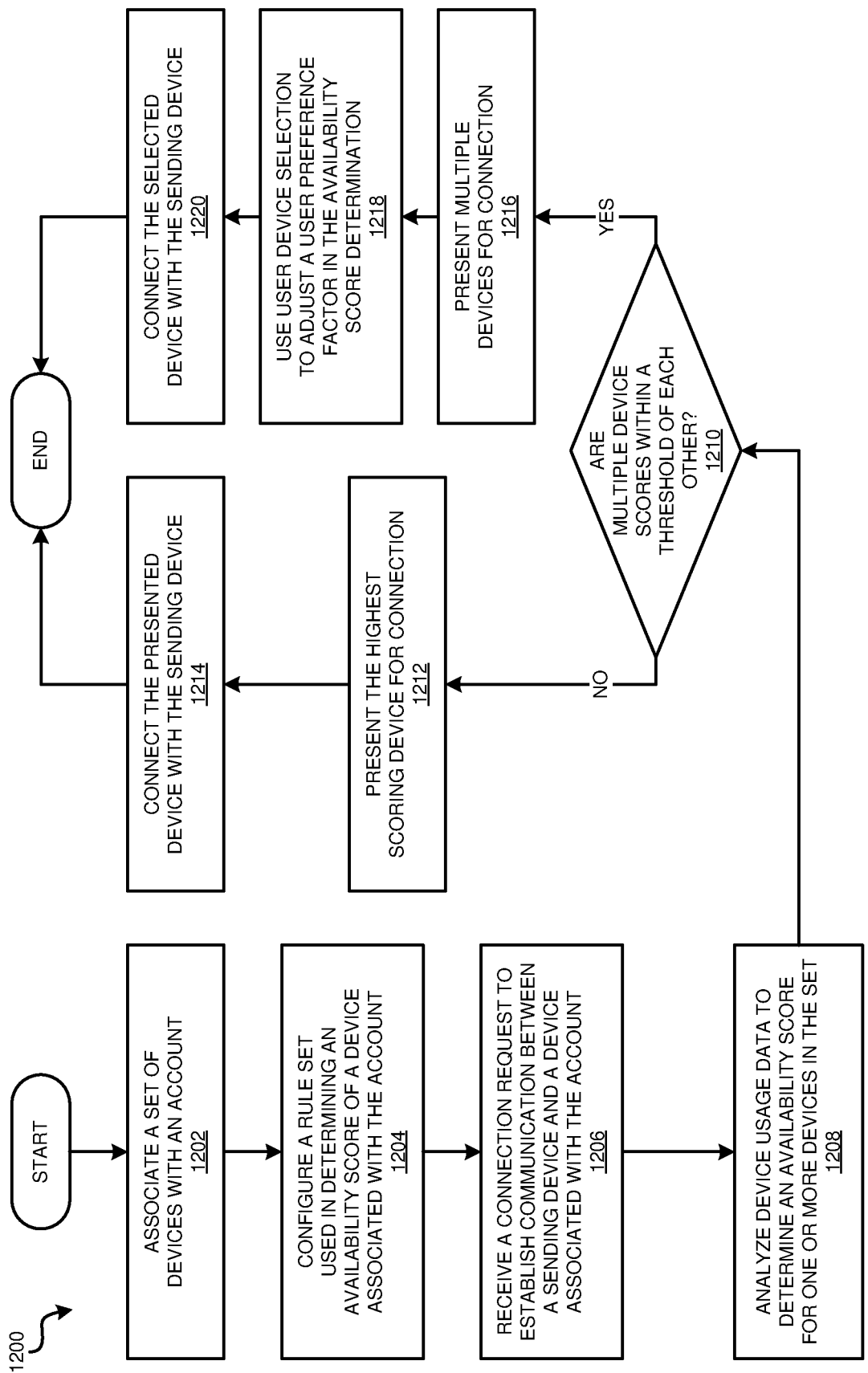
FIG. 12 depicts a flowchart of an example process for multi-device connection management in accordance with an illustrative embodiment.

With reference to FIG. 12, this figure depicts a flowchart of an example process for multi-device connection management in accordance with an illustrative embodiment. Process 1200 can be implemented in application 300 in FIG. 3.

In block 1202, the application associates a set of devices with an account. In block 1204, the application configures a rule set used in determining an availability score of a device associated with the account. In block 1206, the application receives a connection request to establish communication between a sending device and a device associated with the account. In block 1208, the application analyzes device usage data to determine an availability score for one or more devices in the set. In block 1210, the application determines whether multiple device scores are within a threshold of each other. If not ("NO" path of block 1210), in block 1212 the application presents the highest scoring device for connection, then in block 1214 the application connects the presented device with the sending device, then the application ends. Otherwise ("YES" path of block 1210), in block 1216 the application presents multiple devices for connection, in block 1218 the application uses a user device selection to adjust a user preference factor in the availability score determination, and block 1220 the application connects the selected device with the sending device. Then the application ends.

Figure 13:
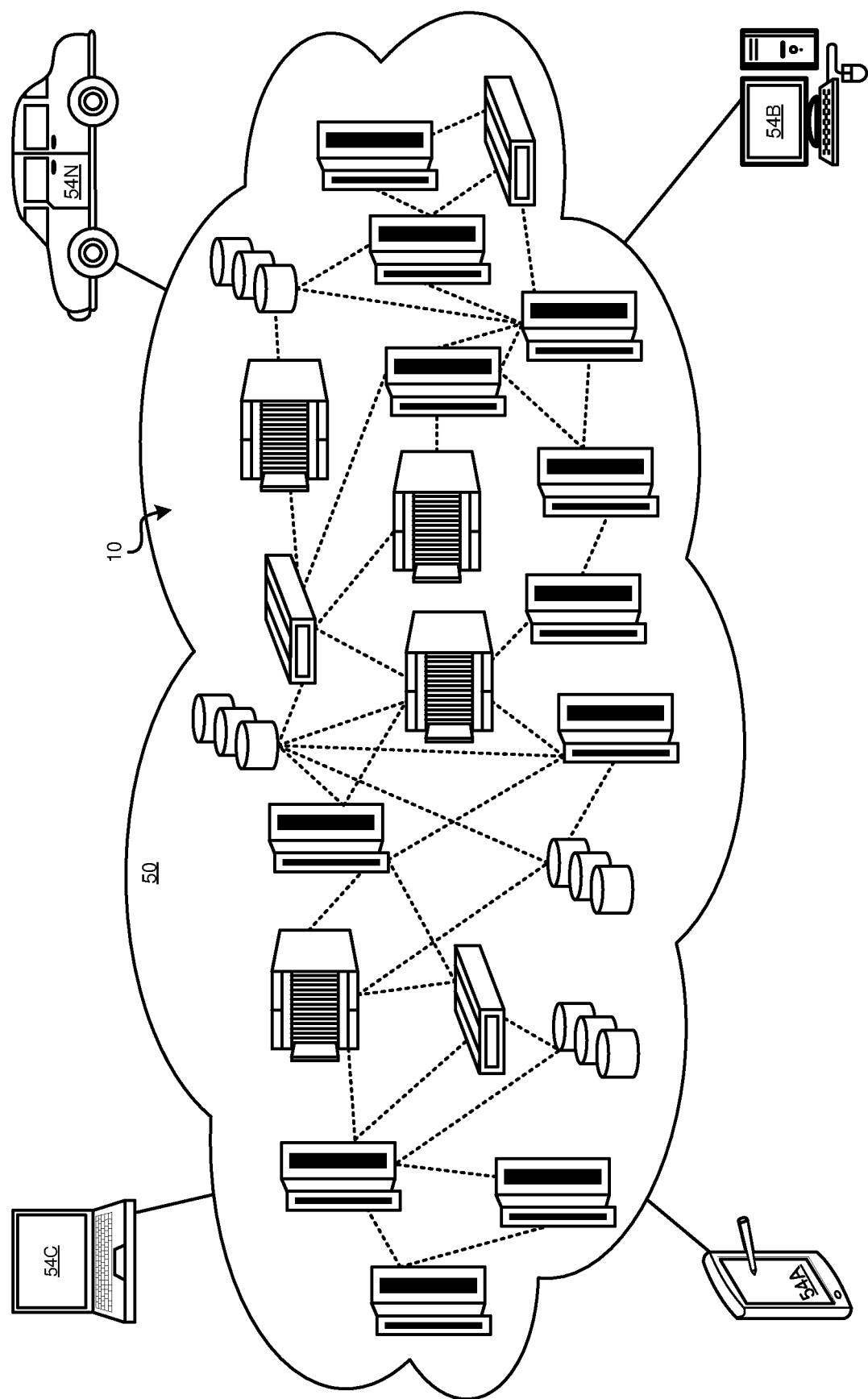
FIG. 13 depicts a cloud computing environment according to an embodiment of the present invention.

Referring now to FIG. 13, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 14:
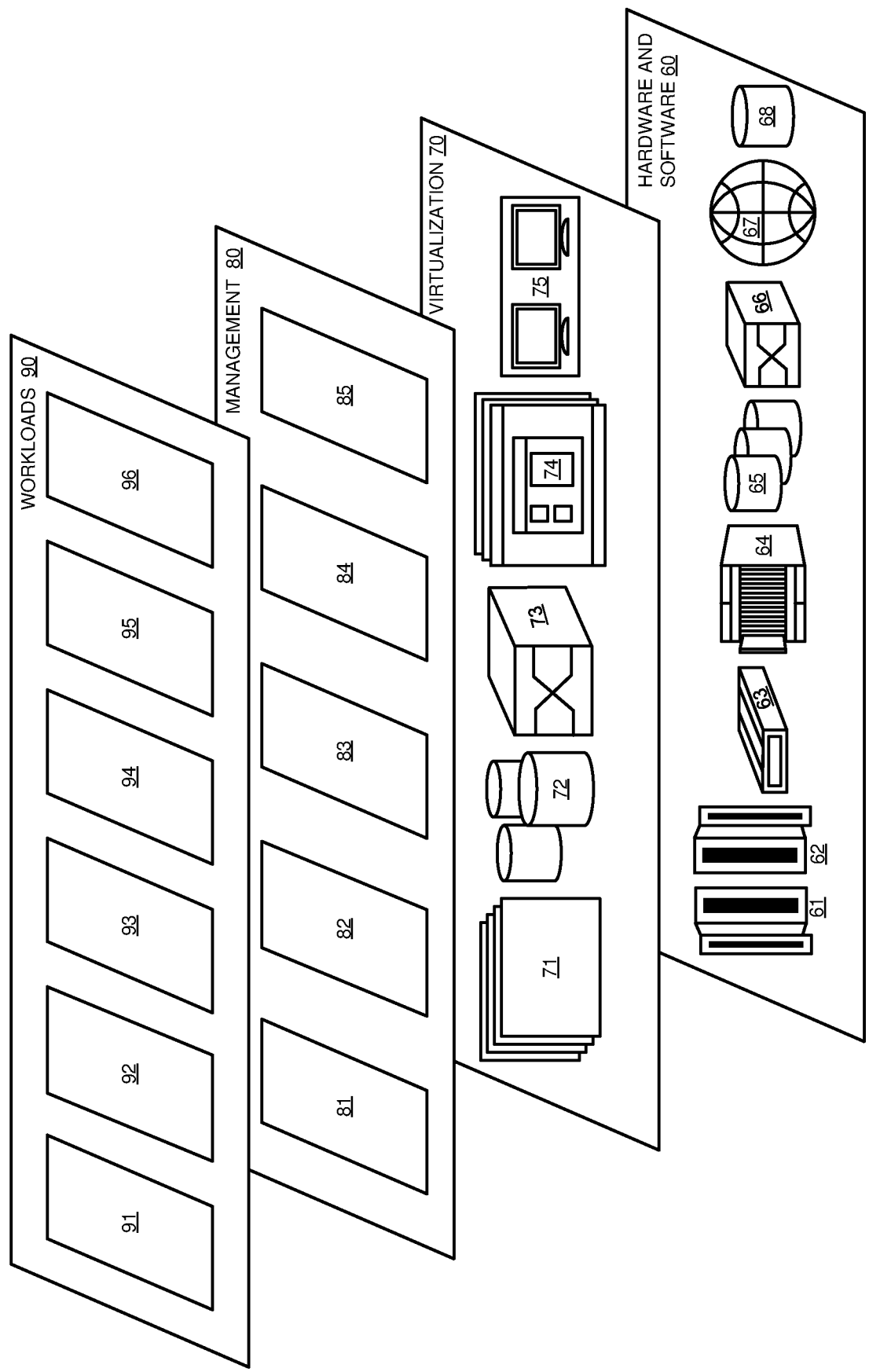
FIG. 14 depicts abstraction model layers according to an embodiment of the present invention.

Referring now to FIG. 14, a set of functional abstraction layers provided by cloud computing environment 50 (FIG. 13) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for multi-device connection management and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   establishing, responsive to a connection request from a sending device to establish communication with an account associated with a set of devices, and based on a comparison of a first availability score of a first device in the set of devices and a second availability score of a second device in the set of devices, a communication connection between the first device and the sending device, wherein an availability score includes a user preference for establishing the communication connection responsive to receiving the connection request and a device capability for responding to the connection request;
   changing in the communication connection with the sending device, responsive to another comparison of the first availability score with an availability score of at least one other device in the set of devices, the first device to the other device for routing the communication request from the sending device to the other device; and
   presenting for user input, responsive to a second connection request to establish a second communication connection, and further responsive to an update to the availability score of at least one device in the set of devices, a request to approve the second communication connection.

2. The computer-implemented method of claim 1, further comprising:
   associating the set of devices with the account.

3. The computer-implemented method of claim 1, further comprising:
   configuring, for the account, a rule set used in determining the availability score of the first device.

4. The computer-implemented method of claim 1, further comprising:
   locating, from a set of sensor data, a user relative to a location of the first device; and
   adjusting, according to the locating, the first availability score.

5. The computer-implemented method of claim 1, wherein the changing is responsive to:
   analyzing device usage data of the other device.

6. The computer-implemented method of claim 1, further comprising:
   adjusting a preference factor, wherein the presenting is further responsive to the adjusted preference factor.

7. A computer program product for multi-device connection management, the computer program product comprising:
   one or more computer readable storage media, and program instructions collectively stored on the one or more computer readable storage media, the program instructions comprising:
   program instructions to establish, responsive to a connection request from a sending device to establish communication with an account associated with a set of devices, and based on a comparison of a first availability score of a first device in the set of devices and a second availability score of a second device in the set of devices, a communication connection between the first device and the sending device, wherein an availability score includes a user preference for establishing the communication connection responsive to receiving the connection request and a device capability for responding to the connection request;
   program instructions to change in the communication connection with the sending device, responsive to another comparison of the first availability score with an availability score of at least one other device in the set of devices, the first device to the other device for routing the communication request from the sending device to the other device; and
   program instructions to present for user input, responsive to a second connection request to establish a second communication connection, and further responsive to an update to the availability score of at least one device in the set of devices, a request to approve the second communication connection.

8. The computer program product of claim 7, further comprising:
   program instructions to associate the set of devices with the account.

9. The computer program product of claim 7, further comprising:
   program instructions to configure, for the account, a rule set used in determining the availability score of the first device.

10. The computer program product of claim 7, further comprising:

program instructions to locate, from a set of sensor data, a user relative to a location of the first device; and program instructions to adjust, according to the locating, the first availability score.

11. The computer program product of claim 7, wherein the program instructions to change are responsive to:

program instructions to analyze device usage data of the other device.

12. The computer program product of claim 7, further comprising:

program instructions to adjust a preference factor, wherein the program instructions to present are further responsive to the adjusted preference factor.

13. The computer program product of claim 7, wherein the stored program instructions are stored in the at least one of the one or more storage media of a local data processing system, and wherein the stored program instructions are transferred over a network from a remote data processing system.

14. The computer program product of claim 7, wherein the stored program instructions are stored in the at least one of the one or more storage media of a server data processing system, and wherein the stored program instructions are downloaded over a network to a remote data processing system for use in a computer readable storage device associated with the remote data processing system.

15. The computer program product of claim 7, wherein the computer program product is provided as a service in a cloud environment.

16. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to establish, responsive to a connection request from a sending device to establish communication with an account associated with a set of devices, and based on a comparison of a first availability score of a first device in the set of devices and a second availability score of a second device in the set of devices, a communication connection between the first device and the sending device, wherein an availability score includes a user preference for establishing the communication connection responsive to receiving the connection request and a device capability for responding to the connection request;

program instructions to change in the communication connection with the sending device, responsive to another comparison of the first availability score with an availability score of at least one other device in the set of devices, the first device to the other device for routing the communication request from the sending device to the other device; and program instructions to present for user input, responsive to a second connection request to establish a second communication connection, and further responsive to an update to the availability score of at least one device in the set of devices, a request to approve the second communication connection.

17. The computer system of claim 16, further comprising:

program instructions to associate the set of devices with the account.

18. The computer system of claim 16, further comprising:

program instructions to configure, for the account, a rule set used in determining the availability score of the first device.

19. The computer system of claim 16, further comprising:

program instructions to locate, from a set of sensor data, a user relative to a location of the first device; and program instructions to adjust, according to the locating, the first availability score.

20. The computer system of claim 16, wherein the program instructions to change are responsive to:

program instructions to analyze device usage data of the other device.

* * * * *